Jan. 21, 1936.  J. THOMSON  2,028,302
LIQUID DISPENSING APPARATUS
Filed Sept. 27, 1933
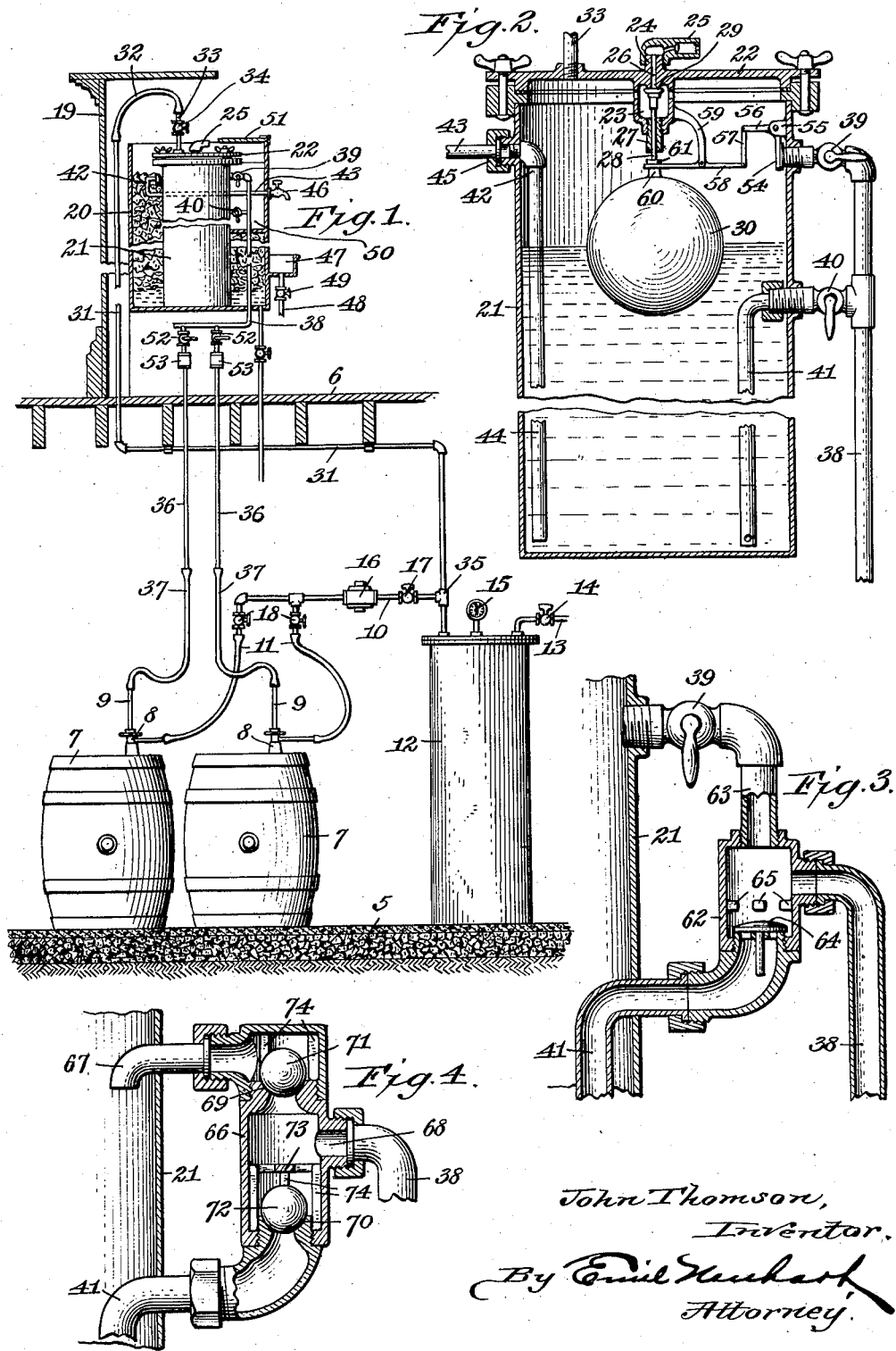
John Thomson, Inventor.
By Emil Neuhart, Attorney.

Patented Jan. 21, 1936

2,028,302

UNITED STATES PATENT OFFICE 2,028,302

LIQUID DISPENSING APPARATUS

John Thomson, Buffalo, N. Y.

Application September 27, 1933, Serial No. 691,167

13 Claims. (Cl. 225—1)

My invention relates to a liquid dispensing apparatus, and more particularly to that type used in dispensing beer or other carbonated beverages.

In beverage dispensing apparatuses, particularly such as are designed for dispensing beer, a thorough cleansing of the apparatus, particularly the conduits thereof, is required at intervals in order to assure the retailing of beer in a palatable and perfectly sanitary condition.

It has been found that beer within a barrel or keg connected to the dispensing apparatus will occasionally become flat, or have a musty taste, due to the barrel or keg not having been properly cleansed, or for other reasons, and in dispensing apparatuses now in use, no provision is made for returning the beer therein to the barrel or keg when such conditions are encountered. Consequently, disconnection of the barrel or keg from the dispensing apparatus will necessarily have to be made and the beer within the apparatus and the conduits thereof leading to the barrel or keg is allowed to run to waste, resulting in a complete loss of the contents.

The primary object of my invention is the provision of a dispensing apparatus in which the supply of beer or other beverage is kept in a cool condition, and provision made when the beer drawn is found flat, musty, or otherwise in an impalatable condition, to return all of the beer within the apparatus and the connections thereof back into the barrel or keg so that it can be returned to the brewery in full supply and in the same condition in which it was received; thus avoiding all loss and entirely clearing the dispensing apparatus of the undesirable product; such return of the beer to the barrel or keg being effected without loss.

Another object of my invention is to provide a dispensing apparatus which can be thoroughly cleaned at any moment, regardless of the quantity of beer remaining in the barrel or keg to which it is connected, since the beer within the dispensing apparatus and its connections to the barrel or keg can be returned to the latter without loss of any portion of the beer or carbonization.

With the above and other objects in view to appear hereinafter, my invention consists in the novel features of construction, in the arrangement and combination of parts, and in the improved apparatus now to be described and particularly set out in the appended claims.

In the accompanying drawing forming part of this specification, Fig. 1 represents a vertical sectional elevation of the complete apparatus and its connection to two beer barrels or kegs.

Fig. 2 is a central vertical section through the beverage tank or container.

Figs. 3 and 4 are sectional elevations illustrating modified forms of valve controls applied to the beverage tank or container to enable the beverage to be returned to its source of supply.

Reference being had to the drawing in detail, 5 designates the basement floor of a building and 6 the floor of a story above the basement. Beer dispensing apparatuses are usually arranged so that the barrels, kegs, or other source of supply for the apparatus are stored in the basement and the beer dispensed on the ground or other floor above the basement. I therefore illustrate, in Fig. 1, two barrels or kegs of beer, which are designated by the numeral 7, and these are usually set upon the floor 5 of the basement, and tapped as at 8. The taps are of any conventional type having slip tap rods 9 passed therethrough and entered into the barrels or kegs. A source of air supply under pressure is connected with the taps, as by means of an air pipe 10 and branch air pipes 11 connected together. The branch pipes 11 preferably have flexible parts so that the barrels or kegs require no exact position on the basement floor, but may be located within any given area for convenient connection to the source of air supply, which is illustrated as a compressed air tank 12 connected by means of a pipe 13 with an air compressor or other medium (not shown) for supplying compressed air thereto, the pipe 13 being opened and closed to control the admission of air to the tank 12 by means of a hand valve 14. The compressed-air tank 12 has a gage 15 thereon so that the pressure within the tank can be determined, and the air pressure regulated as desired.

Within the air pipe 10 a suitable pressure-reducing valve 16 is arranged, which functions to maintain the pressure within the beer barrels or kegs 7 lower than that at which the air is maintained in the tank 11. For example, a pressure of thirty-five pounds may be maintained in the air tank, but before reaching the beer barrels or kegs 7, such pressure will have been reduced to approximately fifteen pounds through the medium of said pressure-reducing valve. The air pipe 10 has a hand valve 17 arranged between the air tank 12 and the pressure reducing valve so as to completely shut off the supply of air from the barrels or kegs when desired, and each of the barrels or kegs may be individually controlled as to its supply of air by means of valves 18 arranged in the branch air pipes 11.

19 designates a dispensing bar or counter which may be constructed in various ways, or may be entirely dispensed with, as this forms no part of my invention. I have illustrated this bar or counter for the reason that this is the conventional manner in which a dispensing apparatus is used, the beer drawn from the dispensing apparatus being usually handed over the top of the bar or counter. I therefore arrange within this bar or counter, underneath the top thereof, an ice tank 20 supported in any approved manner. This tank may be constructed in various ways and merely serves as a medium to receive my improved dispensing tank or container 21 and cool the contents thereof. This dispensing tank or container is preferably cylindrical in cross section, and in order that the interior may be readily accessible it is provided with a top or cover 22 bolted or otherwise removably secured thereto. I have illustrated a top or cover which has axially disposed thereon a depending valve chamber 23 and an upstanding nipple or boss 24 to which an audible signal in the form of a whistle 25 is applied. This cover has an air-relief passage 26 extending therethrough which leads from the interior of the valve chamber 23 to the upper end of the nipple or boss 24 and opens into the whistle 25.

In a sleeve bushing 27, threaded or otherwise applied to the lower end of the valve chamber, a valve stem 28 is slidably arranged, to the upper end of which a valve 29 is secured, which is adapted to open and close the air-relief passage 26 within the cover, the lower end of said valve stem having a float 30 secured thereto. The float 30, valve 29, and whistle 25 form one of many common alarm or signaling devices employed in liquid-dispensing apparatuses of the type herein illustrated and described, and these parts may be varied in form and construction, it being the sole purpose of providing an audible alarm or signal upon lowering of the float within the beer tank or container.

An air inlet pipe 31 is connected to the air tank 12 and extends upwardly through the floor 6 and it terminates within the bar 18; it having connection by means of a hose or other flexible tube 32 with an air inlet pipe 33 passed through the top or cover 22 and opening into the tank or container 21, said air-inlet pipe being provided with a suitable valve 34.

While I have stated that the pipe 31 is connected to the air tank 12, I have illustrated this connection effected through the medium of a portion of the air pipe 10, a suitable T-fitting 35 being provided for this purpose. It will therefore be apparent that the pressure of the tank is maintained within that portion of the air pipe 10 between the air tank 12 and the pressure-reducing valve 16, and also within the air inlet pipe 31, of which the flexible tube 32 forms part and within the air-inlet pipe 33 upwardly from the valve 34 when the latter is closed.

One or more beer supply pipes 36 are connected with the tap rods 9 through the medium of hose or other flexible connections 37, such flexible connections enabling the tap rods to be inserted into the barrels or kegs 7 through the taps 8. These beer supply pipes 36 are connected to a main supply pipe 38 which extends upwardly into the ice tank and has connection at its upper end with an inlet valve 39 threaded into the dispensing tank or container 21 near its upper end. Pipe 38 also has an outer valve 40 connected thereto at a lower level, and this valve is threaded through the wall of said dispensing tank or container and has connected thereto, within said tank or container, a return pipe 41, said pipe extending down to a point in close proximity to the bottom of said tank or container.

The beer is dispensed from the tank or container through an outlet pipe 42 formed in two sections, one an outer section 43 and the other an inner section 44 connected to said outer section, as shown at 45, Fig. 2, or otherwise. The inner section 44 extends down from its point of connection to the outer section to a point in close proximity to the bottom of the tank or container 20. The outer section of the pipe extends through the ice tank and has a dispensing spigot 46 connected thereto, said spigot on the exterior of said ice tank and a drip basin 47 is provided on said ice tank to receive any drippings from the spigot, a drain 48 provided with a valve 49 being threaded into the bottom of said drip pan.

The ice tank may, if desired, be chambered as shown at 50 so that the valves 39 and 40 in the main supply pipe 38 will be accessible through the top of the ice tank 20, which may have a hinged table leaf 51 secured thereto for convenience in placing glasses or other articles thereon, and also to conceal the chamber 50 and the valves 39 and 40.

The beer supply pipe 36, or each of them when more than one is used, is provided with a valve 52 near its upper end so that the dispenser of the beer will have free access thereto, and in this pipe, or each of them, a sight glass 53 is arranged so that the quality of the beer being delivered into the tank or container 21 can be easily ascertained. These sight glasses also make it possible to determine whether or not the barrel or keg from which beer is being drawn is empty, although still retaining a sufficient quantity within the tank or container 21 capable of being dispensed over a reasonable period of time.

The taps 8 and tap rods 9, as well as the beer supply pipes 36 and the flexible connections 37 thereto are now commonly used in dispensing apparatuses, also the air tank 12 with its connections to the taps 8, and a beverage tank or container, float-controlled and connected with the beer supply pipes 36 is also known and in common use; the float being designed to control suitable valve mechanism for automatically opening and closing the beer inlet to the tank or container 21, which is illustrated as the outlet of the valve 39. This valve mechanism may be of any common form now in use, but as illustrated comprises a flap valve 54 pivoted to a bracket 55 extending inwardly from the peripheral wall of the tank or container 21, said valve having an arm 56 disposed at an angle thereto. Arm 56 has a pivot and slot connection 57 with one end of an operating lever 58 pivotally fastened between its ends to the inner or free end of a bracket 59 and its opposite end straddling the valve stem 28 between a boss 60 on the float 30 and a collar 61 on the valve stem.

When the barrels or kegs are tapped and operatively connected with the tank or container 21, it is simply necessary to open the valves 17 and 18, whereupon the air pressure, usually maintained at thirty-five pounds within the tank 12 enters the pressure-reducing valve and is reduced to approximately fifteen pounds, causing delivery of the air to the top of the beer within the barrels or kegs 7 at this pressure, such reduced pressure being preferable, due to the fact that the higher pressure maintained within the air tank 12 would cause the beer to foam excessively when drawn from the spigot 46. With the parts thus arranged, a pressure of approximately fifteen pounds is maintained within the barrels or kegs 7, and upon opening the valve 52 in one of the beer delivery pipes 36 and opening the feed control valve 39, beer is delivered from one of the kegs under proper pressure to the tank or container 21; the valve 54 being held in open position to allow of this, by reason of the float 30 being in its lowermost position.

When the beer reaches a certain level in the tank or container 21, the float is elevated and closes the air-relief passage 26 leading to the whistle 25, through the medium of the valve 29 connected with the float. The apparatus is then in condition to draw beer from the spigot at any desired time; the beer within the tank or container 21 being thoroughly cooled by ice within the ice tank 20 surrounding it.

It is simply necessary to open the spigot 46 to dispense beer in any desired quantity, and during the act of dispensing the beer the level within the tank or container 21 lowers in exact proportion to the amount drawn through the spigot 46, with the result that the float 30 lowers slightly, causing the valve 54 to open and allow a quantity of beer to be delivered to the tank or container 21 in exact proportion to the amount dispensed. Each time the float 30 lowers, the valve 29 opens and gives the signal of the float lowering, but since beer is simultaneously being delivered into the tank or container this signal will be of very short duration.

It is to be understood that the beer is delivered into the tank or container 21 under the pressure maintained in the barrels or kegs 7, and that this pressure is also maintained in the tank or container above the beer therein. Consequently, when opening the spigot 46 the beer is forced upwardly through the inner section 44 of the delivery pipe 42 and out through the outer section 43.

When it is found that the beer is flat or has a musty taste, or when it is desired to clean the apparatus, the beer within the tank or container 21 can be easily returned to the barrel or keg with its impregnated or contained gas. To accomplish this it is only necessary to close the valve 39 and open the valve 40, and after opening the valve 34, air under pressure of approximately thirty-five pounds delivered directly from the air tank 12 will enter the tank or container through the air-inlet pipe 33, thus forcing the beer within the tank or container upwardly through the return pipe 41 out through the valve 40, through the main supply pipe 38, which now becomes a return pipe, and through the beer supply pipe 36, flexible connection 37 thereof, and tap rod 9 back into the barrel or keg from which beer has been drawn, the pressure in excess of the fifteen pounds maintained in the barrel or keg overcoming the pressure in the barrel or keg and assuring a free delivery of the beer from the tank or container into the barrel or keg. When the beer is fully withdrawn from the tank or container, steam, hot water, or any other cleansing medium can be forced into the tank or container and its connections, and if desired the tap rods 9 may be withdrawn from the barrel or keg and a plug substituted therefor in the tap to maintain the desired pressure within the barrel or keg. Upon opening the various valves, steam or hot water may be forced through all of the parts of the apparatus requiring cleansing; or if found necessary, the cap or cover 22 of the tank or container may be removed and access gained thereto for scrubbing or otherwise manually cleaning the various parts. When forcing steam, hot water, or some other cleansing medium through the various parts of the device, this may be introduced through the air-inlet pipe 33, or through the tap rod 9 when removed from a barrel or keg; or parts of the pipes forming the conduit system may be separated and such medium introduced at the point or points of separation.

It is, of course, apparent that when one barrel or keg is emptied it is only necessary to shut off the valve 52 directly associated therewith, it being unnecessary to leave the bar or counter 19 for this purpose. Upon then opening the valve 52 directly associated with the other barrel or keg, the apparatus is in condition to draw beer from the latter any time convenient. Before emptying the newly used barrel or keg, a full barrel or keg can be quickly provided to replace the empty barrel or keg.

The apparatus illustrated in Figs. 1 and 2 provide for the use of manually operating valves to control the inlet of the beer to the tank or container and the return of beer therefrom into a barrel or keg.

In the modification shown in Fig. 3, arrangement is made for controlling the inlet of the beer into the tank or container 21 by a manually-operated valve and the return of the beer from the tank or container to the barrel or keg by an automatically operating valve brought into action, however, only after the inlet valve is closed. In this modification the valve 39 is used in the same manner and location as provided for in the preferred construction, and the return pipe 41 is similarly arranged and has connection with a valve casing 62 to which the manually operated valve 39 is also connected by means of a pipe or nipple 63.

The main beverage supply pipe 38 is connected to said valve casing 62, and within this valve casing is an upwardly-opening valve 64 normally retained in closed position by gravity and the pressure of the beer within said valve casing. To limit the opening movement of the valve, said casing is provided with stop lugs 65 which extend inwardly from the peripheral wall of the valve casing and are contacted by the valve 64 in its upward movement. The supply of beer to the tank or container 21 is controlled by the opening or closing of the valve 39, and although the valve 54 is not illustrated in this figure, this valve or some other closure-medium is provided within the tank or container to close the inner end of said valve 39. When the valve 39 is open, beer is supplied to the tank or container and controlled by the float 30 in the manner hereinbefore described. When it is desired to return the beer from the tank or container to the barrel or keg from which it has been drawn, the valve 39 is closed and air at a pressure above that maintained in the barrel or keg is delivered into the tank or container 21 in the manner hereinbefore stated, whereupon the beer will be forced upwardly through the return pipe 41 within the tank or container, causing the valve 64 to be unseated and the beer to be delivered back into the main supply pipe 38, and from the latter through its regular course to the barrel or keg.

In the modification shown in Fig. 4 the control of the flow of beer to the tank or container and the return of the beer to the barrel or keg is automatically controlled, and although a somewhat different beer-feeding medium is provided for delivering the beer to the tank or container and no valve mechanism shown in connection therewith, it is to be understood that any valve serving the purpose of the valve 54 shown in Fig. 2, may be provided to control the feeding of beer into the tank or container under control of the float 30. In this modification the main beer supply pipe 38 is connected to a valve casing 66 having connection at its upper end with a feed pipe or nipple 67 extending into the tank or container, and at its lower end with the upper end of the return pipe 41.

At opposite sides of the inlet 68 of said valve casing 66, internal valve seats 69, 70 are provided against which gravity valves 71, 72, respectively, are seated, the upward movements of which are controlled, respectively, by the upper wall of said valve casing and a spider 73 in said casing above the valve 72. Retainer ribs 74 are formed on the inner side of this valve casing to maintain the valves 71 and 72 in approximate alinement with their respective valve seats during their upward and downward movement. In this modification, upon drawing beer through the spigot 46, the float lowering in exact proportions to the amount of beer dispensed will cause the valve 54, or some other similar control medium, to open the inner end of the pipe or nipple 67, whereupon the pressure of the beer underneath the valve 71 will lift said valve and allow the beer to enter the tank or container, the pressure of the beer within the valve casing 66 maintaining the valve 72 in closed position.

When it is found necessary or desirable to return the beer in the tank or container to the barrel or keg, connection may be made directly with the air tank 12 in the manner hereinbefore described, and this will result in the beer being elevated under pressure above that within the main supply pipe 38, with the result that the pressure beneath the ball valve 72 being in excess of the pressure above, will elevate said valve and allow the beer to be returned to the barrel or keg through the main supply pipe 38 and its connections. It is, of course, understood that the pressure between the two ball valves 71 and 72 would also unseat the ball valve 71, but no beer could enter the tank or container, due to the fact that the pressure above the beer within said tank or container equals that beneath the ball valve 71, and in addition thereto the weight of the float and its connection will keep the valve 54, or any equivalent device employed, closed against the pipe or nipple 67.

Various modifications may be resorted to without departing from my invention or sacrificing any of the advantages thereof as fairly fall within the scope of the appended claims.

Having thus described my invention, what I claim is:

1. The combination with a barrel containing a liquid and a compressed-air tank connected to said barrel under reduced pressure, of a liquid container having manually-controllable connection with said compressed-air tank under the normal pressure within the latter, a liquid-supply pipe connecting said barrel with said liquid container at a high point, means to control the supply of liquid from said liquid-supply pipe into said liquid container according to the level of the liquid therein, and a return pipe connecting said liquid supply pipe with said container with a low point of the latter, said return pipe having connection with said barrel through said liquid-supply pipe.

2. The combination with a barrel containing a liquid and a source of air supply under pressure connected to said barrel to supply the same with air under a predetermined pressure, of a liquid container from which the liquid is to be drawn, means of connection between said source of air supply and said liquid container manually controllable and serving to charge said liquid container with air under pressure greater than supplied to said barrel, a liquid-supply pipe connecting said barrel with said liquid container at an elevated point, and a liquid return pipe connected to said liquid-supply pipe and opening into said container at a low point.

3. An apparatus for dispensing liquid, comprising a container having a liquid inlet, a liquid outlet and a compressed-air inlet, and a liquid-return pipe connected to the source of the liquid and to said container and terminating at a point of said container lower than said liquid inlet.

4. In an apparatus for dispensing liquid, the combination with a source of liquid supply, of a container having conduit connection with said liquid supply, means for drawing liquid from said container, means for introducing air under pressure to said container above the liquid therein, means for automatically controlling the supply of liquid to said container, a liquid return pipe connected to said conduit connection and opening into said container at a low point thereof, and shut-off devices in said conduit connection and said liquid return pipe.

5. In an apparatus for dispensing liquid, the combination with a source of liquid supply, of a container having conduit connection with said source of liquid supply, means for drawing liquid from said container, means for introducing air under pressure to said container above the liquid therein, a liquid return pipe connected to said conduit connection and opening into said container at a low point thereof, and manually operative valves in said conduit connection near its delivery end and in said liquid return pipe between said conduit connection and said container.

6. In an apparatus for dispensing liquid, the combination with a source of liquid supply, of a container having conduit connection with said source of liquid supply, means for drawing liquid from said container, means for introducing air under pressure to said container above the liquid therein, a liquid return pipe connected to said conduit connection and opening into said container at a low point thereof, a manually operative valve to shut off said conduit connection from said container, and a valve automatically closing the outlet of said return pipe.

7. In an apparatus for dispensing liquid, the combination with a source of liquid supply, of a container having conduit connection with said source of liquid supply, means for drawing liquid from said container, means for introducing air under pressure to said container above the liquid therein, a liquid return pipe connected to said conduit connection and opening into said container at a low point thereof, and automatically operating valves controlling the flow of liquid through said conduit connection into said container and the return of the liquid through said return pipe back to the source of liquid supply.

8. In an apparatus for dispensing liquid, the combination of a container having an inlet pipe and an outlet pipe for the liquid, an air supply pipe connected to said container above the liquid therein, automatic means governed by the level of the liquid within said container for venting said container and for regulating the supply of liquid to said container according to the amount drawn therefrom, and means for discharging the liquid from said container and delivering it into said inlet pipe between its inlet and outlet ends when introducing air under pressure through said air supply pipe.

9. The combination with a barrel containing a liquid and a source of air pressure connected to said barrel under reduced pressure, of a liquid container having connection with said source of air pressure under pressure increased over that supplied to said barrel, a liquid supply pipe connecting said barrel with said liquid container at a high point, and a return pipe connecting said liquid supply pipe with the interior of said liquid container at a low point of the latter, said return pipe having connection with said barrel through said liquid supply pipe.

10. An apparatus for dispensing liquid, comprising a container having a liquid inlet, a liquid outlet and a compressed air inlet, a valve controlling the admission of liquid into said container, and a liquid return pipe connected to the source of the liquid and to said container and terminating at a point of said container lower than said liquid inlet.

11. An apparatus for dispensing liquid comprising a container having a liquid inlet provided with a valve controlling the flow of liquid into said container according to the pressures at opposite sides of said valve, a liquid outlet, a compressed air inlet, and a liquid return pipe connected to said liquid supply pipe between said valve and the source of liquid and opening into said container at a point lower than said liquid inlet.

12. An apparatus for dispensing liquid, the combination with a source of liquid supply, of a container having conduit connection with said source of liquid supply, means for drawing liquid from said container, means for introducing air under pressure to said container above the liquid therein, a liquid return pipe connected to said conduit connection and opening into said container at a low point thereof, and a valve in said conduit connection between the connection of said liquid return pipe therewith and said container.

13. An apparatus for dispensing liquid, the combination with a source of liquid supply, of a container having conduit connection with said source of liquid supply, means for drawing liquid from said container, means for introducing air under pressure to said container above the liquid therein, a valve to shut off said conduit connection from said container, and a liquid return pipe connected to said conduit connection between said valve and the source of liquid supply, said liquid return pipe opening into said container at a low point.

JOHN THOMSON.